United States Patent
Nienhaus

(10) Patent No.: US 6,550,511 B2
(45) Date of Patent: Apr. 22, 2003

(54) ARRANGEMENT COMPRISING A WHEEL AND A DEVICE FOR FILLING OR DEFLATING A TIRE OF A VEHICLE, ESPECIALLY OF A TRACTOR

(75) Inventor: Clemens Nienhaus, Neunkirchen-Seelscheid (DE)

(73) Assignee: GKN Walterscheid GmbH (DE)

( * ) Notice: Subject to any disclaimer, the term of this patent is extended or adjusted under 35 U.S.C. 154(b) by 0 days.

(21) Appl. No.: 09/949,940

(22) Filed: Sep. 12, 2001

(65) Prior Publication Data

US 2002/0040748 A1 Apr. 11, 2002

(30) Foreign Application Priority Data

Sep. 12, 2000 (DE) .......................... 100 44 886

(51) Int. Cl.⁷ .............................. B60C 23/10
(52) U.S. Cl. ...................... 152/415; 152/417
(58) Field of Search .............. 152/415, 417, 152/418, 419, 426, 427, 429

(56) References Cited

U.S. PATENT DOCUMENTS

| 3,532,140 A | * | 10/1970 | Hoffman | .................. | 141/65 |
|---|---|---|---|---|---|
| 4,441,539 A | * | 4/1984 | Hulse | ................ | 137/624.14 |
| 4,598,750 A | * | 7/1986 | Gant | .................. | 137/225 |
| 4,641,698 A | * | 2/1987 | Bitonti | .................. | 137/223 |
| 4,754,792 A | * | 7/1988 | Braun et al. | ................ | 137/224 |
| 5,253,688 A | * | 10/1993 | Tigges | .................. | 152/417 |
| 5,398,743 A | * | 3/1995 | Bartos | .................. | 137/225 |
| 5,553,647 A | * | 9/1996 | Jaksic | .................. | 152/415 |
| 5,591,281 A | * | 1/1997 | Loewe | .................. | 152/418 |
| 5,988,774 A | * | 11/1999 | Jonner et al. | .............. | 303/113.5 |

FOREIGN PATENT DOCUMENTS

| DE | OS 1 907 082 | | 9/1970 |
|---|---|---|---|
| DE | 1907082 A | * | 9/1970 |
| DE | 1 605 743 | | 1/1971 |

* cited by examiner

Primary Examiner—S. Joseph Morano
Assistant Examiner—Frantz F. Jules
(74) Attorney, Agent, or Firm—Harness, Dickey & Pierce, P.L.C.

(57) ABSTRACT

A wheel 1 for a tractor has a wheel rim 2 and a wheel center member 3 to connect to a wheel flange of the tractor. Furthermore, a device 8 is provided to fill or deflate a tire mounted on the wheel 1. This device has a housing 14 fixed to the wheel center member 3. The housing 14 rotates with the center member. An inner member 21 is supported in this housing 14. An annular chamber 25 is formed between the two. The annular chamber 25 is formed between the two. The annular chamber 25 is connected, via a pipe 12, to a first connecting port 10, on the wheel rim 2, and to a second connecting port 11, coupled with a valve 9. Furthermore, the annular chamber 25 is connectable, via a third connecting port 29 and via a main valve 30, to a compressed air generator or compressor.

7 Claims, 3 Drawing Sheets

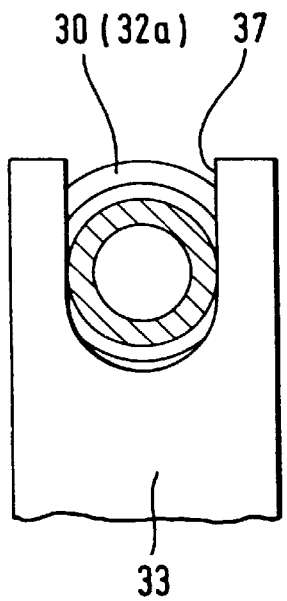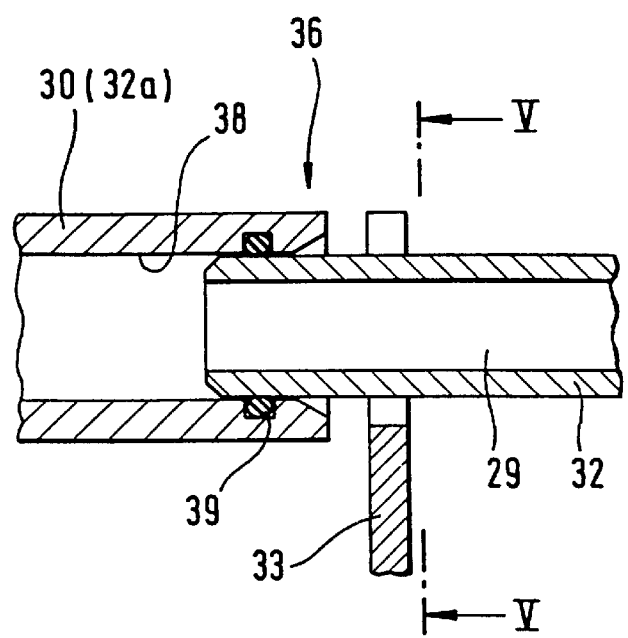
Fig. 5
Fig. 4

ARRANGEMENT COMPRISING A WHEEL AND A DEVICE FOR FILLING OR DEFLATING A TIRE OF A VEHICLE, ESPECIALLY OF A TRACTOR

CROSS-REFERENCE TO RELATED APPLICATIONS

This application claims priority to German Patent Application No. 100 44 886.0 filed Sep. 12, 2000, which application is herein expressly incorporated by reference.

FIELD AND BACKGROUND OF THE INVENTION

The present invention relates to wheels for vehicles, especially for tractors which have a wheel rim to receive a tire which is filled with air. Also, a device to fill or deflate the tire is included. The device includes a housing and an inner member. A rotary transmission leadthrough is formed. On one side, the device is connectable to a pressure generator. On the other side, the device is connected, via a pipe, to the inner chamber of the tire to be filled.

A tire filling unit is described in DE OS 1 907 082. This reference shows that it is necessary for vehicles with relative high circumferential speeds to switch the rotary transmission leadthrough during normal operation such that no pressure exists to switch the tire filling unit to a non-operation position Accordingly, problems occur on the sealing elements of the rotary connection when the filling unit is active during normal operation of the wheel. This problem is very obvious when large diameter tires are present as is in the case of tractors.

In tractors, a change of the air pressure in a tire is of critical importance. During operation in the field, with a lower tire pressure, in a lower soil compaction area, higher traction is achievable. In the technical magazine profi-magazine for agrartechnik, October 1995 "Der Luftdruck im Reifen; Kleine Ursache, grosse Wirkung" ("The air pressure in the tire small causes, large effects") different control systems can be found. According to this, rotary transmitters are arranged on the inner side or the outer side of the wheel according to the axle type. In inexpensive systems, the air supply is achieved from the outside past the wheel to the rotary transmission leadthrough. In an arrangement with an intermediate flange between the wheel and the wheel flange, the attachment of the rotary transmission leadthrough is achieved via wheel screws. This embodiment has the advantage that no pipes are provided that are exposed to the outside. However, the critical screw connection is higher stressed by the enlarged free bending length of the wheel screws. A further disadvantage is that the hoses which make the wheel change troublesome, are still provided on the inside of the wheel center member. The hoses have a flexible connection which is necessary during the wheel change.

SUMMARY OF THE INVENTION

The invention has the object to develop an arrangement which prevents damage. The object is solved according to the invention by an arrangement comprising a wheel with a wheel rim. The wheel rim receives a tire which is fillable with air. The rim has a first connecting port for the passage of air. A wheel center member is on the wheel rim. The wheel center is attached to the tractor and serves to connect a wheel flange of the vehicle.

A device for filling or deflating the tire is coupled with the rim. The device has a housing fixed to the wheel center member. A bore and a second connecting port are in the housing. A pipe connects the first connecting port to the second connecting port.

An inner member is rotatably received in the bore of the housing. The inner member is provided with a third connecting port which is connected, via a connection means, to a pressure generator. Retaining means are provided for the stationary support of the inner member of the vehicle. A control valve is arranged on the second connecting port. An annular chamber is connected to the second connecting port and the third connecting port. The annular chamber is formed between the housing and the inner member. The third connecting port is connected to a pipe, leading to the pressure generator, via a coupling and a main valve.

With this arrangement it is possible to achieve a rigid piping on the inner side of the wheel center member. The piping leads from the housing to the corresponding pipe connector on the wheel rim. A quick connection can be achieved by the coupling. This connection can further be used as a torque support. Accordingly, the inner member is kept non-rotational on the tractor.

In a further improvement of the invention, the valve is electrically controllable. Also, a transmission unit for electrical control lines is connected to the control valve. The control lines are guided, via the inner member, to the outside to the main valve and/or a control unit. The transmission unit is arranged between the housing and the inner member.

Further, a first pressure pipe is connected to a third connecting port. The pipe is connectable to a retainer as a torque support on the side of the vehicle. Thus, the inner member is kept non-rotational. The quick coupling (push-in-coupling) is arranged to the end. The quick coupling is distanced from the third connecting port of the first pressure pipe.

Preferably, the housing is annular. The housing may be detachably connected to the wheel center member. The arrangement on the wheel center member is achieved outside the connection of the wheel center member to the wheel flange of the tractor. Thus, there is no negative influences of the connection of the wheel with the wheel flange on the side of the vehicle.

From the following detailed description, taken in conjunction with the drawings and subjoined claims, other objects and advantages of the present invention will become apparent to those skilled in the art.

BRIEF DESCRIPTION OF THE DRAWINGS

A preferred embodiment of the invention is represented schematically in the drawings:

FIG. 4 is a sectional view through the connection between the port of the annular chamber and the connecting pipe, or the main valve in the form of a coupling arranged on a holder.

FIG. 5 is a sectional view along the line V—V in FIG. 4.

DETAILED DESCRIPTION OF THE PREFERRED EMBODIMENTS

Figure 1:
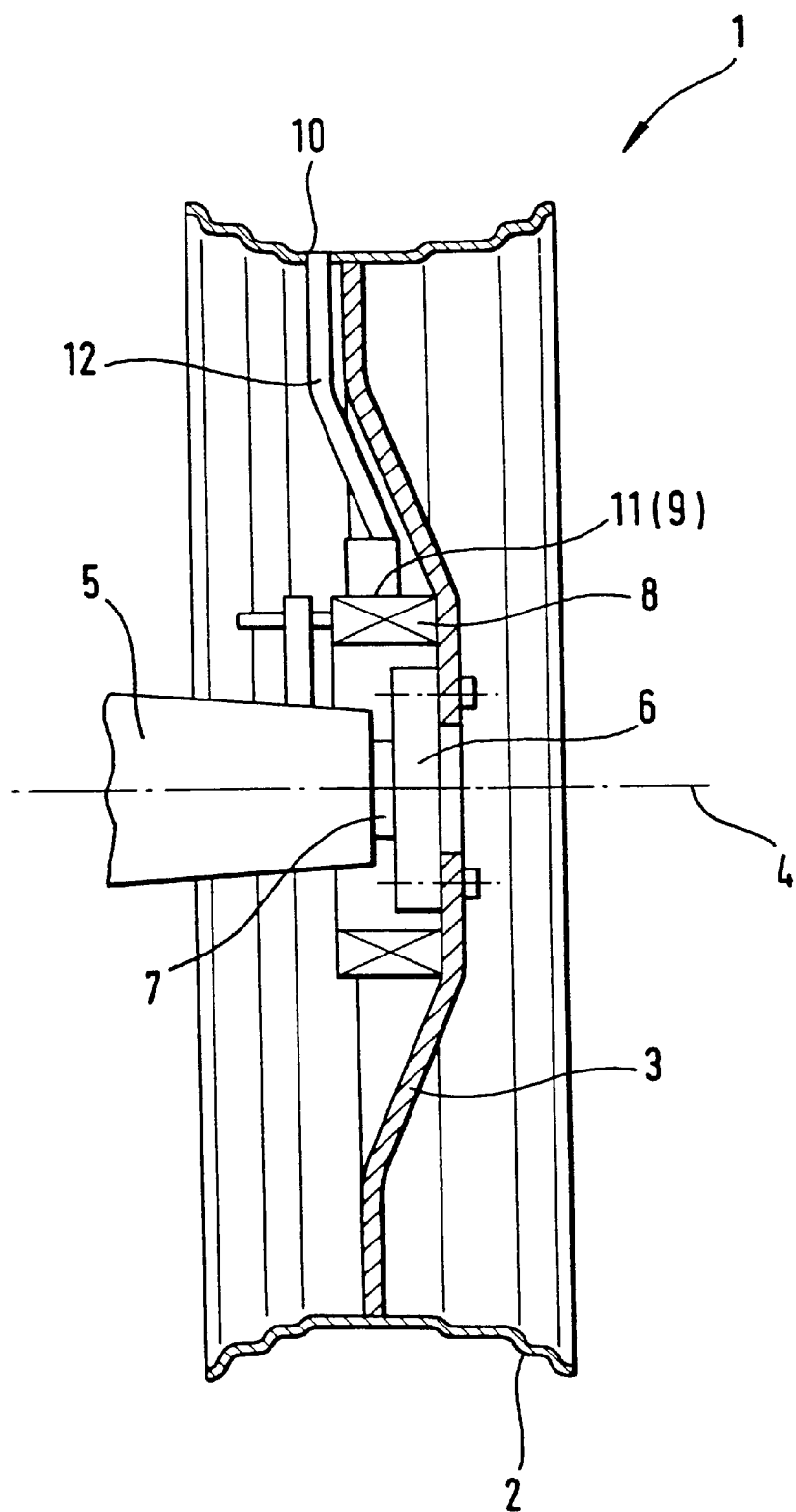
FIG. 1 is a partial sectional view of a wheel projecting from the axle tube of a tractor in accordance with the present invention.

FIG. 1 shows the wheel 1 without a tire. The wheel 1 includes a wheel rim 2 to receive a tire and a wheel center member 3. The wheel center member 3 is attached around the axis of rotation 4 to the wheel flange 6 of the axle shaft 7. The axle shaft 7 projects from the axle tube 5. The wheel flange 6 is secured to the wheel center member 3 by screws. The wheel 1 and the wheel flange 6 are driven rotationally via the axle shaft 7 around the axis of rotation 4. Only the axle tube 5 of the tractor is represented.

A rotary transmission leadthrough is fast with the wheel center member 3. The rotary transmission leadthrough is coaxially arranged around the wheel flange 6. The rotary transmission leadthrough represents a part of the device 8 to fill or deflate the tire. The device 8 to fill or deflate also includes a first connecting port 10 on the wheel rim 2; a second connecting port 11 on the housing of the device 8 for filling or deflating; a valve 9 connected to the device 8; and a pipe 12 that connects the first connecting port 10 to the second connecting port 11. The valve 9 also replaces the common air valve arranged on the tire or the wheel rim, respectively. The air is transported to the device 8 by a central air pressure supply, via means which is not represented in more detail.

Figure 2:
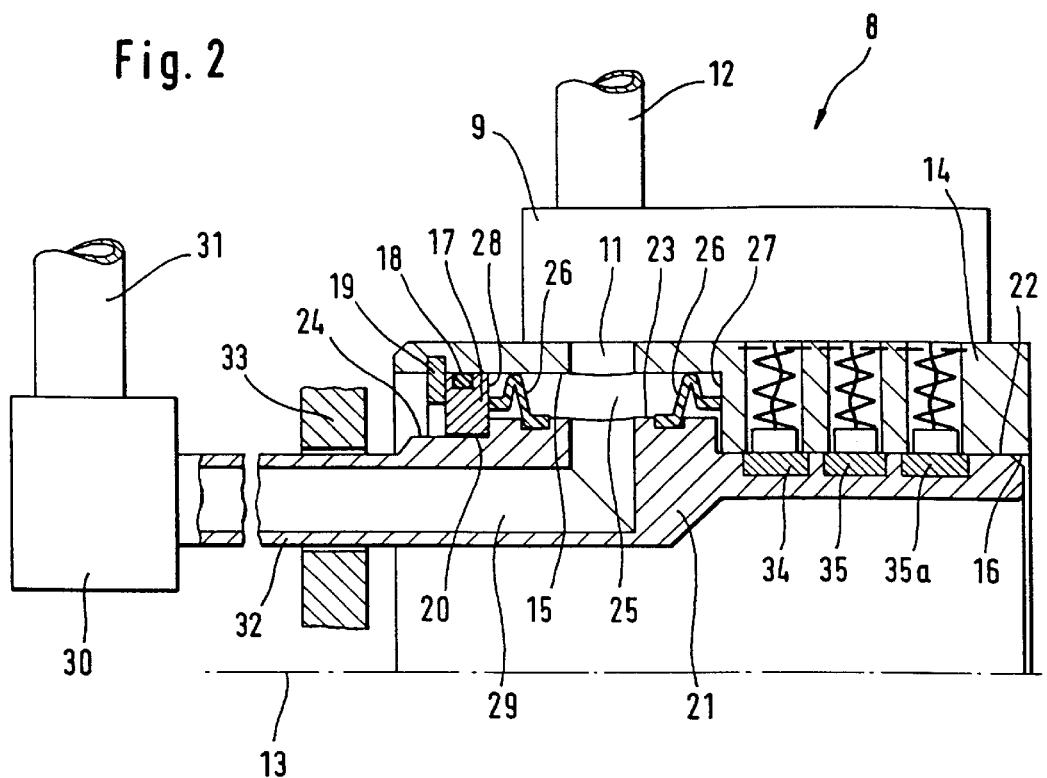
FIG. 2 is an enlarged longitudinal sectional view of a port of the device for filling or deflating a tire.
Figure 3:
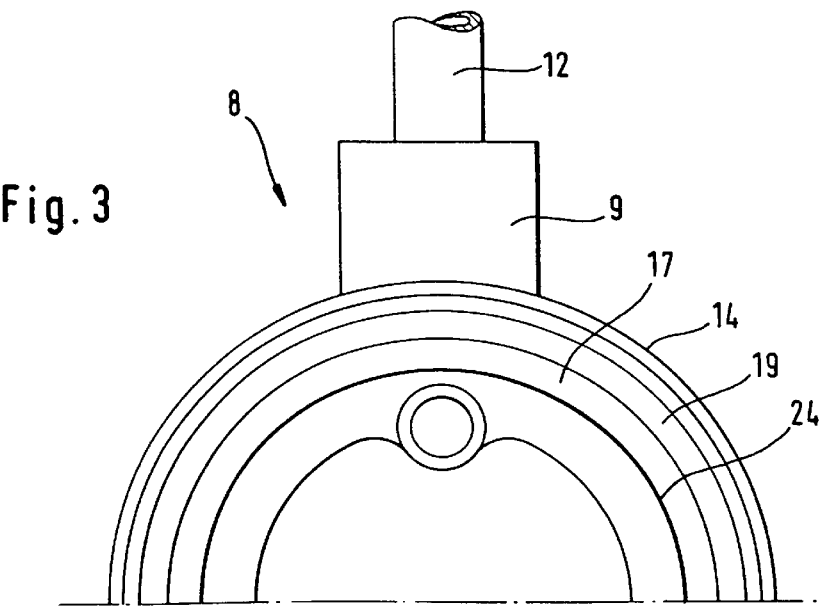
FIG. 3 is a side view of FIG. 2.

FIGS. 2 and 3 show more detail of the device 8 to fill or deflate a tire. The longitudinal axis of the device 8 for filling or deflating a tire is designated with the reference numeral 13. The device 8 is mounted on the wheel center member 3 such that the longitudinal axis 13 coincides with the axis of rotation 4.

The device 8 includes an annular housing 14 with a bore 15. A first bearing bore 16 is visible to the right hand side of the bore 15. The bearing bore 16 is reduced in diameter. On the left hand side, the bore 15 is closed by a lid 17, which is retained by a retaining ring 19. The lid 17 is sealed in the bore 15 by the seal 18. The lid 17 has a second bearing bore 20. The bearing bore 20 is also reduced in diameter in relation to the bearing bore 15.

An inner member 21 is rotationally supported in the housing 14. The inner member 21 has a first step face 22. The first step face 22 is rotationally received in the first bearing bore 16. A second step face 23 of the inner member 21 is larger in diameter than the first step face 22 and is also larger than a third step face 14 is received in the bearing bore 20.

An annular chamber 25 is delimited by a first mating surface 27 which closes the bore 15 to the right hand side. A seal 26 abuts a second mating surface 28, which belongs to the lid 17. The seals 26 also abuts the second step face 23. The enlargement provided by the second step face 23 in relation to the first step face 22 and the third step face 24 serves as an axial retainer of the inner member 21 in relation to the housing 14. The inner member 21 also includes a third connecting port 29. The third connecting port 29 achieves a pipe connection by a push-in-coupling with a main valve 30. The main valve 30 includes a connecting port 31 for the pressure generator or compressor.

The push-in-coupling can be provided at the third connecting port 29 of the inner member 21. Also, the coupling can be provided in the area of the main valve 30 or between the two. In case the coupling is attached to the main valve 30, a connecting pipe 32 is provided. The connecting pipe 32, during assembly of the wheel, is engagable with a retainer 33. The retainer 33, for example, is attached to the axle tube. Thus, the inner member 21 is kept stationary when the wheel is attached while the housing 14 rotates with the wheel center member.

A second connecting port 11 in the housing 14 connects the valve 9 to the annular chamber 25. The pipe 12 leads to the first connecting port 10 in the area of the wheel rim as represented in FIG. 1. The pipe 12 is again connected to the valve 9.

Electric slip ring transmitters 34, 35, 35a are provided between the housing 14 and inner member 21. The electric slipping transmitters 34, 35, 35a connect electric control lines or an electric power supply line and a ground line to the valve 9, and to an external operating unit, or the main valve 30, respectively. If a connection to the mass is ensured via the flange connection to the axle tube, the third slip ring transmitter 35a can be omitted.

To achieve, for example, a pressure increase during rotation of the wheel 1, the main valve 30 is connected to a current. The compressed air arriving through the connection 31 and the main valve 30 is directed, via the connecting pipe 32, into the third connecting port 29 and, in turn, into the annular chamber 25. Since the annular chamber 25 is connected, via the second connecting port 11, to the valve 9, the air can be directed through the valve 9. The valve 9 opens into the tire when a predetermined pressure is exceeded in the pipe 12 to the first connecting port 10. The valve 9 is formed as a non-return or check valve. If the desired pressure is achieved, the main valve 30 is closed and vented to the atmosphere so that the annular chamber 25 is unpressurized.

If the pressure in the tire is too high and should be deflated, the valve 9 is connected to a current and is opened. The air can either be directed from the valve 9 directly, via a channel, to the outside or via the annular chamber 25, to the main valve 30. From the main valve 30, the air, via an air vent, is directed to the outside. If the desired pressure is achieved, the valve 9 is switched currentless (or OFF) and therefore is closed. The predetermined pressure is kept in the tire.

The main valve 30 as well as the valve 9 are in their normal condition (state) currentless or non-powered. Therefore, in case of a power failure, there is no danger that a pressure loss is generated in the tire. However, no filling procedure can be started. Thus, no excess pressure can be generated. Preferably, electromagnetic actuated valves are used as the valves 9, 30 which enable a simple programming. The device can also be designed such that an automatic filling and deflating procedure can be selected. A high comfort with a high security against faulty operation is, therefore, achieved. For example the pressure ratios for working on the field as well as for driving on the road can be stored in a control unit for different devices. The device can be simply activated and the pressure, specified for the device for driving on the road or on the field, is then generated, In cases where permanent pressure monitoring is desired, this can be achieved by an electrical manometer arranged on the valve 9. Accordingly, an additional slip ring transmitter is needed. In the permanent monitoring a regulation depending on the load can also be used.

FIGS. 4 and 5 illustrate an enlarged scale of the connection by a push-in coupling 36. The connector pipe 32 is in the form of a tubular lug. The pipe 32 comprises the third connecting port 29. The lug is inserted into a bore 38 of a tubular socket. The socket belongs directly to the main valve 30 or to a connecting pipe portion 32a. The lug is sealed, via a seal 39, retained in the bore 38. To facilitate insertion, a conical guide face is provided in the connecting pipe portion 32a. When assembling the wheel, the connecting pipe 32 is inserted into the recess 37 of the retainer 33. The retainer 33 is formed in a fork-like shape in this area. Thus, a stationary connection of the inner member 21 to the axle shaft 5, on which the retainer 33 is mounted, is given in the rotational direction around the axis of rotation 4.

While the above detailed description describes the preferred embodiment of the present invention, the invention is susceptible to modification, variation and alteration without deviating from the scope and fair meaning of the subjoined claims.

What is claimed is:

1. A wheel arrangement comprising:

a wheel having a wheel rim for receiving a tire fillable with air, said rim having a first connecting port for the passage of air, a wheel center member for attaching the wheel rim with a connecting wheel flange of a vehicle;

a device for filling or deflating the tire, said device comprising a housing fixed to the wheel center member;

a bore and a second connecting port;

a pipe connecting the first connecting port to the second connecting port;

an inner member rotatably received in the bore of the housing, a third connecting port for connection by connection means to a pressure generator, and retaining means for providing stationary support of the inner member on the vehicle, a control valve coupled with the second connecting port, an annular chamber connected with the second connecting port and the third connecting port, said annular chamber formed between the housing and the inner member, and said third connecting port connected, via a coupling, to a pipe leading to the pressure generator and a main valve and said third connecting port is connected to a connecting pipe, said connecting pipe also serves as one of the retaining means and is connectable to a holder as a torque support on the side of the vehicle.

2. The wheel arrangement according to claim 1, wherein the housing is annular.

3. The wheel arrangement according to claim 1, wherein the housing is detachably connected to the wheel center member.

4. The wheel arrangement according to claim 1, wherein the device for filling or deflating of the tire is attached on the inner side of the wheel center member to be joined to the wheel flange.

5. The wheel arrangement according to claim 1, wherein the coupling is arranged between the connecting pipe and the third connecting port.

6. The wheel arrangement according to claim 1, wherein the coupling is provided between the main valve and the connecting pipe.

7. The wheel arrangement according to claim 1, wherein the control valve is electrically controllable and a transmission unit for electrical control lines is provided between the housing and the inner member, said lines lead, via the inner member, to the outside and to the main valve and/or a control unit and are connected to the control valve.

* * * * *